United States Patent
Xu et al.

(10) Patent No.: US 11,341,735 B2
(45) Date of Patent: May 24, 2022

(54) IMAGE RECOMMENDATION METHOD, CLIENT, SERVER, COMPUTER SYSTEM AND MEDIUM

(71) Applicant: BOE TECHNOLOGY GROUP CO., LTD., Beijing (CN)

(72) Inventors: Jingtao Xu, Beijing (CN); Jianwen Suo, Beijing (CN); Xiangyang Liu, Beijing (CN); Tingting Wang, Beijing (CN); Shaonan Zhang, Beijing (CN); Bo Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 34 days.

(21) Appl. No.: 16/905,588

(22) Filed: Jun. 18, 2020

(65) Prior Publication Data

US 2021/0019550 A1  Jan. 21, 2021

(30) Foreign Application Priority Data

Jul. 17, 2019 (CN) .......................... 201910646302.9

(51) Int. Cl.
*G06V 10/46* (2022.01)
*G06F 16/583* (2019.01)
(Continued)

(52) U.S. Cl.
CPC .......... *G06V 10/462* (2022.01); *G06F 16/583* (2019.01); *G06K 9/6215* (2013.01);
(Continued)

(58) Field of Classification Search
CPC .. G06K 9/4671; G06K 9/4604; G06K 9/6215; G06K 9/6271; G06K 9/6212;
(Continued)

(56) References Cited

U.S. PATENT DOCUMENTS 9,679,227 B2 * 6/2017 Taylor ................ G06K 9/00637
9,965,798 B1 * 5/2018 Vaananen ............. F25D 27/005
(Continued)

FOREIGN PATENT DOCUMENTS

CN    101576896 A    11/2009
CN    104199842 A    12/2014
(Continued)

OTHER PUBLICATIONS

"First Office Action and English language translation", CN Application No. 201910646302.9, dated May 20, 2021, 18 pp.
(Continued)

*Primary Examiner* — Matthew C Bella
*Assistant Examiner* — Kathleen M Broughton
(74) *Attorney, Agent, or Firm* — Myers Bigel, P.A.

(57) ABSTRACT

This disclosure provides an image recommendation method, a client, a server, a computer system and a medium. The method includes acquiring an image, sending the acquired image to a server, such that the server extracts a scale invariant feature of the acquired image and performs retrieval of identical images according to the scale invariant feature of the acquired image, and such that the server extracts a multi-scale feature of the acquired image and performs retrieval of similar images according to the multi-scale feature of the acquired image, and receiving at least one recommended image. The at least one recommended image is based on result of the identical image retrieval and result of the similar image retrieval.

12 Claims, 7 Drawing Sheets

(51) Int. Cl.
  *G06K 9/62*  (2022.01)
  *G06T 1/20*  (2006.01)
  *G06T 5/00*  (2006.01)
  *G06V 10/44* (2022.01)
(52) U.S. Cl.
  CPC ............... *G06T 1/20* (2013.01); *G06T 5/006* (2013.01); *G06V 10/44* (2022.01)
(58) Field of Classification Search
  CPC .. G06F 16/583; G06F 16/5854; G06F 16/532; G06F 16/535; G06T 1/20; G06T 5/006
  See application file for complete search history.

(56) References Cited

U.S. PATENT DOCUMENTS

| | | | |
|---|---|---|---|
| 2014/0101195 A1 | 4/2014 | Li et al. | |
| 2018/0248995 A1* | 8/2018 | Rhoads | G06K 9/6267 |
| 2019/0110753 A1* | 4/2019 | Zhang | G16H 50/20 |

FOREIGN PATENT DOCUMENTS

| | | | | |
|---|---|---|---|---|
| CN | 104217221 A | | 12/2014 | |
| CN | 105512175 A | | 4/2016 | |
| CN | 108009191 A | | 5/2018 | |
| CN | 108287833 A | | 7/2018 | |
| CN | 108564557 A | * | 9/2018 | ............... G06T 3/00 |
| CN | 108897786 A | * | 11/2018 | |
| CN | 108920720 A | | 11/2018 | |
| CN | 108984657 A | * | 12/2018 | |
| CN | 109408648 A | | 3/2019 | |
| CN | 109582813 A | * | 4/2019 | |

OTHER PUBLICATIONS

"Second Office Action and English language translation", CN Application No. 201910646302.9, dated Feb. 7, 2022, 19 pp.

* cited by examiner

IMAGE RECOMMENDATION METHOD, CLIENT, SERVER, COMPUTER SYSTEM AND MEDIUM

RELATED APPLICATIONS

This application claims the benefit of the Chinese patent application No. 201910646302.9 filed on Jul. 17, 2019, the entire disclosure of which is incorporated herein by reference.

TECHNICAL FIELD

The invention relates to the field of image processing technologies, and in particular, to an image recommendation method, a client, a server, a computer system and a medium.

BACKGROUND

A current image recommendation approach requires that a user inputs text description of image related information at a client, for example, the name, author, style, etc. of an image, and a server sends a recommended image to the client of the user according to the received image related information. In this image recommendation approach, when the user finds an image of which related information such as name, author, etc. is unknown in an actual environment, it cannot be implemented that he wants to enjoy the image utilizing a display device such as an electronic picture screen.

Therefore, it is necessary to provide a new image recommendation method, client, server, computer system and medium.

SUMMARY

An object of this disclosure is to provide an image recommendation method, a client, a server, a computer system and a medium to resolve at least one of the problems existing in the prior art.

According to a first aspect of the disclosure, there is provided an image recommendation method for a client including: acquiring an image; sending the image to a server, such that the server extracts a scale invariant feature of the image and performs retrieval of identical images according to the scale invariant feature of the image, and such that the server extracts a multi-scale feature of the image and performs retrieval of similar images according to the multi-scale feature of the image; and receiving at least one recommended image, wherein the at least one recommended image is based on result of the identical image retrieval and result of the similar image retrieval.

In an embodiment, the method further includes: presenting the at least one recommended image and/or sending the at least one recommended image to a display device in order that the display device presents the at least one recommended image.

In an embodiment, before the sending the image to a server, the method further includes: performing distortion correction algorithm based image processing on the acquired image.

In an embodiment, the image processing includes the following steps: performing straight line detection using an LSD straight line detection operator to obtain interfered straight lines, grouping the interfered straight lines obtained by the detection into a horizontal set and a vertical set, merging approximately parallel lines in the interfered straight lines, determining optimal boundary lines and vertices in the merged straight lines, performing perspective transformation processing on the image based on the optimal boundary lines and vertices.

In an embodiment, the image processing further includes: performing adjustment of the optimal vertices in response to manual adjustment of vertices inputted by the user via a user interface.

A second aspect of this disclosure provides an image recommendation method for a server including: receiving an image sent by a client; extracting a scale invariant feature of the image and performing retrieval of identical images according to the scale invariant feature of the image, and extracting a multi-scale feature of the image and performing retrieval of similar images according to the multi-scale feature of the image; and sending at least one recommended image to the client according to result of the identical image retrieval and result of the similar image retrieval.

In an embodiment, the extracting a scale invariant feature of the image and performing retrieval of identical images according to the scale invariant feature of the image, and extracting a multi-scale feature of the image and performing retrieval of similar images according to the multi-scale feature of the image, further includes: extracting a scale invariant feature transformation (SIFT) feature of the image and performing retrieval of identical images according to the SIFT feature of the image, and extracting a residual network (Resnet) feature of the image and performing retrieval of similar images according to the Resnet feature of the image.

In an embodiment, the extracting a SIFT feature of the image and performing retrieval of identical images according to the SIFT feature of the image, and extracting a Resnet feature of the image and performing retrieval of similar images according to the Resnet feature of the image, further includes: utilizing a central processing unit (CPU) to extract a SIFT feature of the image and perform retrieval of identical images according to the SIFT feature of the image, and utilizing a graphics processing unit (GPU) to extract a Resnet feature of the image and utilizing the CPU to perform retrieval of similar images according to the Resnet feature of the image.

In an embodiment, the extracting a SIFT feature of the image and performing retrieval of identical images according to the SIFT feature of the image further includes: extracting SIFT feature points of the image; comparing the SIFT feature points of the image with SIFT feature points of individual standard images in an image library and determining a standard image whose SIFT feature points are identical to those of the image the most; and judging whether the number of the identical SIFT feature points of the determined standard image and the image is greater than a preset threshold, wherein if it is, result of the identical image retrieval is the determined standard image, and if it is not, result of the identical image retrieval is that no identical image exists.

In an embodiment, the extracting a Resnet feature of the image and performing retrieval of similar images according to the Resnet feature of the image further includes: extracting Resnet features of the image, performing dimension reduction and Hash quantization on the Resnet features of the image to obtain the Hash code of the image, calculating the Hamming distances between the Hash code of the image and the Hash codes of the individual standard images in the image library, and taking preset number of standard images ranked ahead from small to large according to the Hamming distances as result of the similar image retrieval.

A third aspect of this disclosure provides a client including: an image acquirer configured to acquire an image; a first sender configured to send the image to a server, such that the server extracts a scale invariant feature of the image and performs retrieval of identical images according to the scale invariant feature of the image, and such that the server extracts a multi-scale feature of the image and performs retrieval of similar images according to the multi-scale feature of the image; and a first receiver configured to receive at least one recommended image from the server, wherein the at least one recommended image is based on result of the identical image retrieval and result of the similar image retrieval.

A fourth aspect of this disclosure provides a server including: a second receiver configured to receive an image sent by a client; an identical image retriever configured to extract a scale invariant feature of the image and perform retrieval of identical images according to the scale invariant feature of the image; a similar image retriever configured to extract a multi-scale feature of the image and perform retrieval of similar images according to the multi-scale feature of the image; and a recommender configured to send at least one recommended image to the client according to result of the identical image retrieval and result of the similar image retrieval.

A fifth aspect of this disclosure provides a computer system including a memory, a processor and a computer program which is stored on the memory and may run on the processor, wherein when executing the computer program, the processor implements: receiving an image sent by a client, extracting a scale invariant feature of the image and performing retrieval of identical images according to the scale invariant feature of the image, and extracting a multi-scale feature of the image and performing retrieval of similar images according to the multi-scale feature of the image, and sending at least one recommended image to the client according to result of the identical image retrieval and result of the similar image retrieval.

In an embodiment, the extracting a scale invariant feature of the image and performing retrieval of identical images according to the scale invariant feature of the image, and extracting a multi-scale feature of the image and performing retrieval of similar images according to the multi-scale feature of the image, further includes: extracting a scale invariant feature transformation (SIFT) feature of the image and performing retrieval of identical images according to the SIFT feature of the image, and extracting a residual network (Resnet) feature of the image and performing retrieval of similar images according to the Resnet feature of the image.

In an embodiment, the extracting a SIFT feature of the image and performing retrieval of identical images according to the SIFT feature of the image, and extracting a Resnet feature of the image and performing retrieval of similar images according to the Resnet feature of the image, further includes: utilizing a central processing unit (CPU) to extract a SIFT feature of the image and perform retrieval of identical images according to the SIFT feature of the image, and utilizing a graphics processing unit (GPU) to extract a Resnet feature of the image and utilizing the CPU to perform retrieval of similar images according to the Resnet feature of the image.

In an embodiment, the extracting a SIFT feature of the image and performing retrieval of identical images according to the SIFT feature of the image further includes: extracting SIFT feature points of the image; comparing the SIFT feature points of the image with SIFT feature points of individual standard images in an image library and determining a standard image whose SIFT feature points are identical to those of the image the most; and judging whether the number of the identical SIFT feature points of the determined standard image and the image is greater than a preset threshold, wherein if it is, result of the identical image retrieval is the determined standard image, and if it is not, result of the identical image retrieval is that no identical image exists.

In an embodiment, the extracting a Resnet feature of the image and performing retrieval of similar images according to the Resnet feature of the image further includes: extracting Resnet features of the image, performing dimension reduction and Hash quantization on the Resnet features of the image to obtain the Hash code of the image, calculating the Hamming distances between the Hash code of the image and the Hash codes of the individual standard images in the image library, and taking preset number of standard images ranked ahead from small to large according to the Hamming distances as result of the similar image retrieval.

In an embodiment, the computer system is a cloud server, and the cloud server is built with a CPU Docker and a GPU Docker.

In an embodiment, the GPU Docker is configured to extract a multi-scale feature of an image, and the CPU Docker is configured to extract a scale invariant feature of the image and perform retrieval of identical images according to the scale invariant feature of the image and perform retrieval of similar images according to the multi-scale feature of the image.

A sixth aspect of this disclosure provides a computer readable storage medium with a computer program stored thereon, wherein when executed by a processor, the program implements the method of the first aspect of this disclosure.

BRIEF DESCRIPTION OF THE DRAWINGS

In the following, specific implementations of this disclosure will further be described in detail in connection with the drawings.

DETAILED DESCRIPTION

Figure 1:
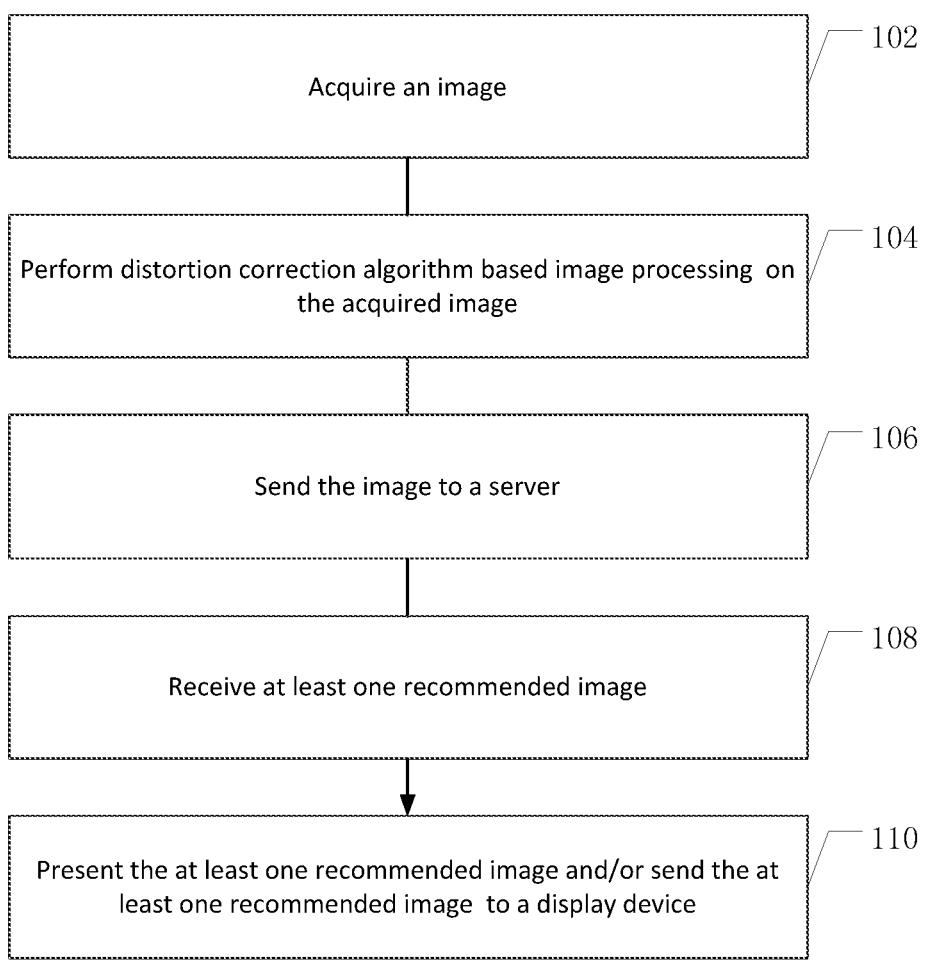
FIG. 1 shows a flow chart of an image recommendation method for a client according to an embodiment of this disclosure.

In order to more clearly describe this disclosure, in the following, this disclosure will further be illustrated in connection with preferred embodiments and the drawings. Similar components are denoted with identical reference signs in the drawings. It should be understood by the person having skills in the art that the content specifically described in the following is illustrative rather than restrictive, and should not limit the protection scope of the invention.

FIG. 1 shows a flow chart of an image recommendation method for a client according to an embodiment of this disclosure. The method begins at step 102, wherein the client acquires an image. In an example, the client is a portable electronic device including a smart phone, a tablet computer, a personal digital assistant, a game console, a laptop notebook, a smart wearable device, etc. In another example, the client further includes a stationary device, for example, an electronic picture screen (or called an electronic photo album, an electronic picture frame, etc.), a television, a computer, etc. In an example, the acquisition includes taking a photo (e.g., with a camera on a portable electronic device), receiving from other device, receiving from a network, and the like.

At step 106, the image is sent to a server, such that the server extracts a scale invariant feature of the image and performs retrieval of identical images according to the scale invariant feature of the image, and such that the server extracts a multi-scale feature of the image and performs retrieval of similar images according to the multi-scale feature of the image At step 108, at least one recommended image is received, wherein the at least one recommended image is based on result of the identical image retrieval and result of the similar image retrieval.

The image recommendation method provided by this embodiment may directly perform retrieval of identical images and retrieval of similar images efficiently and accurately in an image library based on an image acquired by a user with a client, and perform accurate image recommendation according to the retrieval result, which may greatly improve the user experiences. Therein, on one hand, the scale invariant feature maintains invariance to rotation, scale scaling, brightness change, and also maintains a certain degree of stability with respect to viewing angle change, affine transformation, noise, and therefore, the image recommendation method provided by this embodiment performs retrieval of identical images that needs an exact match according to the scale invariant feature of the image. On the other hand, the multi-scale feature can better characterize information such as image color, content, etc., and the robustness is higher when it is used in image similarity matching, and therefore, the image recommendation method provided by this embodiment performs retrieval of similar images according to the multi-scale feature of the image. Thus, it can be seen that the image recommendation method provided by this embodiment may realize accurate image recommendation, in order for the user to present it on a display device such as an electronic picture screen, a television, a projector, etc. for enjoyment.

In some optional implementations of this embodiment, further, at step 110, the at least one recommended image is presented and/or the at least one recommended image is sent to a display device in order that the display device presents the at least one recommended image. In an example, the display device includes an electronic picture screen, a television, a projector, etc.

By employing the above implementations, the user may directly utilize the client to enjoy the at least one recommended image, or also may make use of a display device such as an electronic picture screen, a television, a projector, etc. to enjoy the at least one recommended image.

Further, if there are multiple recommended images, the client responds to a selection operation of the user and presents a recommended image selected by the user from the multiple recommended images, and/or the client responds to a selection operation of the user and sends a recommended image selected by the user from the multiple recommended images to a display device such as an electronic picture screen, such that the display device presents the selected recommended image. For example, when the server retrieves identical images, the at least one recommended images sent to the client include one identical image and 19 similar images ranked top 19 from large to small according to the similarity, and when the server does not retrieve identical images, the at least one recommended images sent to the client include 20 similar images ranked top 20 from large to small according to the similarity. The client displays thumbnails of 4 recommended images each page in a paging manner. The client responds to a click operation on a thumbnail by the user and sends a recommended image corresponding to the thumbnail clicked by the user to the display device for being displayed by the display device.

In some optional implementations of this embodiment, before the client sends the acquired image to the server, the method further includes: at step 104, performing distortion correction algorithm based image processing on the acquired image.

By employing this implementation, the accuracy of the retrieval of identical images and the retrieval of similar images and subsequent image recommendation may be guaranteed. Further, since the amount of calculation of the distortion correction algorithm is small, that the implementation utilizes the client to perform distortion correction algorithm based image processing on the acquired image will not affect the image processing speed substantially, and avoids the following drawback resulting from the server performing distortion correction algorithm based image processing on the image: in general, a transmitted image will be compressed and sent to the server, and this will more or less introduce a certain amount of image distortion, thereby affecting the effect of distortion correction performed at the server side.

Figure 2:
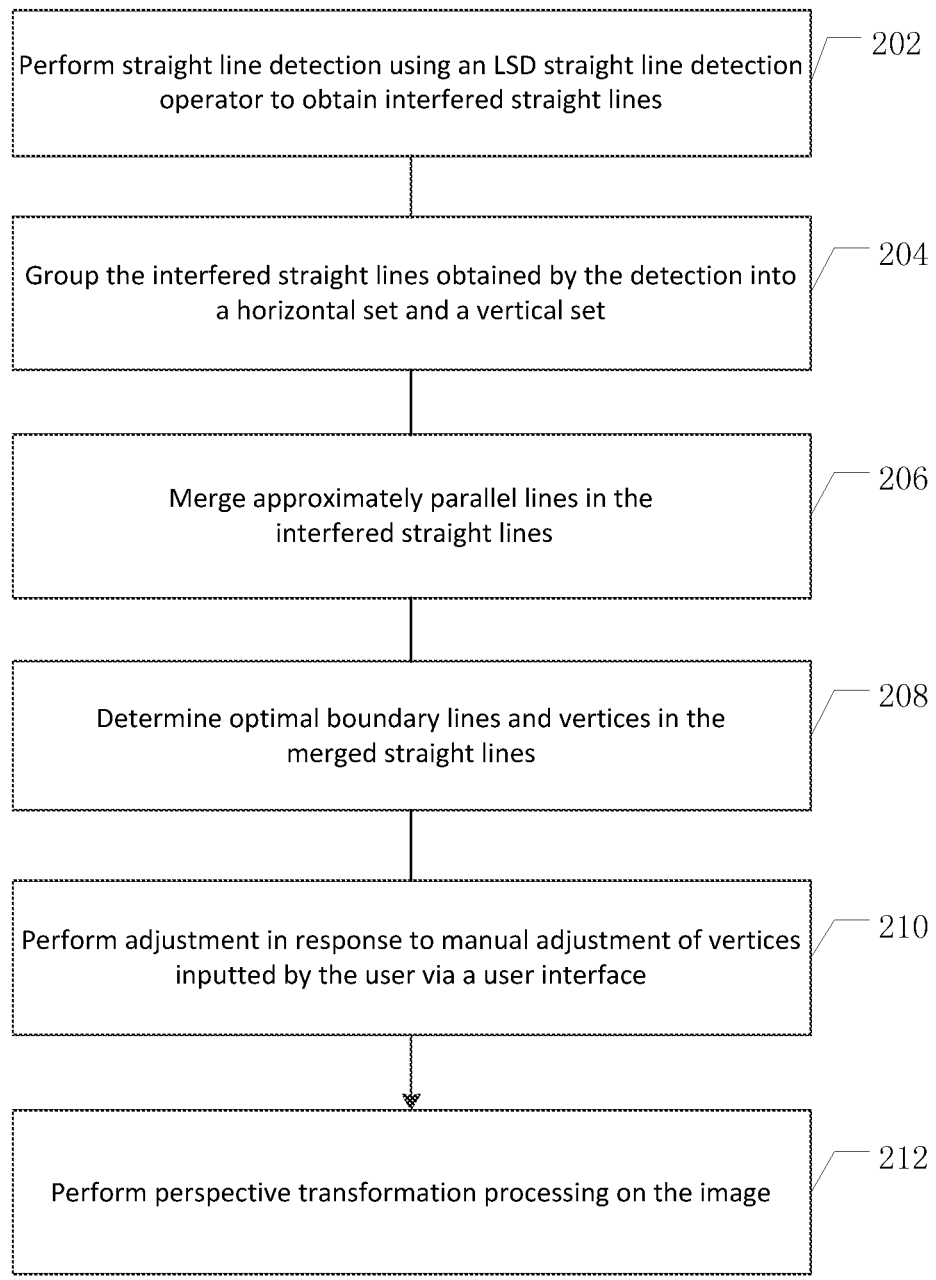
FIG. 2 shows a flow chart of distortion correction algorithm based image processing for an acquired image.

Therein, performing distortion correction algorithm based image processing on the acquired image includes correcting distortion between the image and an object to be detected caused by factors such as shooting angle and position of the image, etc. FIG. 2 shows specific steps of image processing. The image processing begins at step 202, wherein straight line detection is performed using an LSD (Line Segment Detector) straight line detection operator to obtain interfered straight lines. Then, at step 204, the interfered straight lines obtained by the detection are grouped into a horizontal set and a vertical set, wherein the angle between each interfered straight line and the horizontal axis is calculated, wherein an interfered straight line whose angle is within a range of 0 to 45 degrees is allocated to the horizontal set, and an interfered straight line whose angle is within a range of 45 to 90 degrees is allocated to the vertical set. Then, at step 206, approximately parallel lines in the interfered straight lines are merged, wherein the angle (the calculation range is 0 to 90 degrees) and distance between every two interfered straight lines are counted and calculated, two interfered straight lines whose angle and distance are less than an angle threshold and a distance threshold respectively are merged into one straight line, the straight line after merging is the longer of the two interfered straight lines, and the score value of the straight line after merging is taken as the sum of the score values of the two interfered straight lines. At step 208, optimal boundary lines and vertices are determined in the merged straight lines, wherein since for an image acquired by a client, for example, for an image taken by a smart phone, an object to be retrieved will generally be located in the center of the image under normal circumstances, the vertical set and the horizontal set are grouped the second time: for the vertical set, it is grouped into a top straight line set TopLineSet and a bottom straight line set BottomLineSet based on the image center; and for the horizontal set, it is grouped into a left straight line set LeftLineSet and a right straight line set RightLineSet based on the image center. Any one straight line in an individual set of TopLineSet, BottomLineSet, LeftLineSet and RightLineSet is taken, parameters of parallelism, area and matching degree of the graph constituted by the four straight lines are calculated, and the graph is given a score according to the above parameters. A straight line combination with the highest score is the optimal combination, and is considered the optimal boundary lines, LineLeft, LineRight, LineTop and LineBottom. In the obtained four optimal boundary lines, vertices where two lines intersect are calculated, and the obtained four vertices are the top left vertex PLeftTop, the bottom left vertex PLeftBottom, the top right vertex PRightTop and the bottom right vertex PRightBottom, respectively.

In an optional embodiment, at step 210, it may be possible to perform adjustment in response to manual adjustment of vertices inputted by the user via a user interface. Since for example the vertices obtained when the image is taken with a complex background may not be ideal, the vertices may be manually adjusted to cause them to be at ideal positions.

Finally, at step 212, perspective transformation processing is performed on the image, wherein the distance w between the bottom left vertex PLeftBottom and the bottom right vertex PRightBottom in the four vertices is calculated, the corrected image height h=ratio*w, four new target vertex positions corresponding to the four vertices are PLeftTop_new(0, 0), PLeftBottom_new(0, h), PRightTop_new(w, 0), PRightBottom_new(w, h), a perspective transformation matrix may be obtained from the actual four vertices and the four target vertices corresponding thereto, and a corrected image may be obtained by performing perspective transformation processing on the distorted image based on the perspective transformation matrix.

Figure 3:
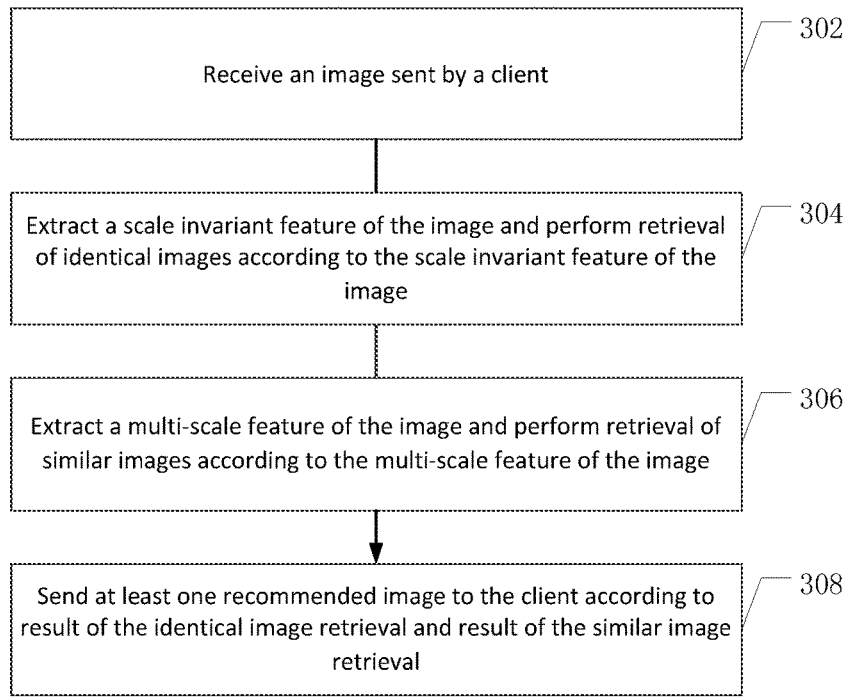
FIG. 3 shows a flow chart of an image recommendation method for a server according to an embodiment of this disclosure.

FIG. 3 shows a flow chart of an image recommendation method for a server according to an embodiment of this disclosure. The method begins at step 302, wherein an image sent by a client is received. At step 304, a scale invariant feature of the image is extracted and retrieval of identical images is performed according to the scale invariant feature of the image. At step 306, a multi-scale feature of the image is extracted and retrieval of similar images is performed according to the multi-scale feature of the image. At step 308, at least one recommended image is sent to the client according to result of the identical image retrieval and result of the similar image retrieval.

The image recommendation method provided by this embodiment may directly perform retrieval of identical images and retrieval of similar images efficiently and accurately in an image library based on an image acquired by a user with a client, and perform accurate image recommendation according to the retrieval result, which may greatly improve the user experiences. Therein, on one hand, the scale invariant feature maintains invariance to rotation, scale scaling, brightness change, and also maintains a certain degree of stability with respect to viewing angle change, affine transformation, noise, and therefore, the image recommendation method provided by this embodiment performs retrieval of identical images that needs an exact match according to the scale invariant feature of the image. On the other hand, the multi-scale feature can better characterize information such as image color, content, etc., and the robustness is higher when it is used in image similarity matching, and therefore, the image recommendation method provided by this embodiment performs retrieval of similar images according to the multi-scale feature of the image. Thus, it can be seen that the image recommendation method provided by this embodiment may realize accurate image recommendation, in order for the user to present it on a display device such as an electronic picture screen, a television, a projector, etc. for enjoyment.

In some optional implementations of this embodiment, the step 304 may further include: extracting a SIFT (scale invariant feature transformation) feature of the image and performing retrieval of identical images according to the SIFT feature of the image.

Furthermore, the step 304 may further include: utilizing a CPU to extract a SIFT feature of the image and perform retrieval of identical images according to the SIFT feature of the image.

In some optional implementations of this embodiment, the step 306 may further include: extracting a Resnet feature of the image and performing retrieval of similar images according to the Resnet feature of the image.

Furthermore, the step 306 may further include: utilizing a GPU to extract a Resnet feature of the image and utilizing the CPU to perform retrieval of similar images according to the Resnet feature of the image.

Since the Resnet network is relatively complex and utilizing the CPU to extract a Resnet feature will affect the operation speed, this implementation utilizes the GPU to extract a Resnet feature of the image, which may increase the efficiency of Resnet feature extraction and shorten the response time of Resnet feature extraction. In addition, utilizing the GPU to extract a Resnet feature of the image and utilizing CPU to perform retrieval of similar images according to the Resnet feature of the image may further implement relatively parallel processing, which may further guarantee the efficiency of the retrieval of similar images.

In a specific example, the server is a cloud server, the CPU is a CPU Docker (Docker is an open-source application container engine) constructed by the cloud server, and the GPU is a GPU Docker constructed by the cloud server. The algorithm deployment of the retrieval of identical images and the retrieval of similar images employs a Docker deployment scheme in which the GPU Docker is combined with the CPU Docker, which can effectively assess the utilization of hardware resources and facilitate algorithm transplantation and resource expansion, in which the CPU Docker and the GPU Docker may share the same hardware resource and a hardware resource may be increased or decreased and shared or separately used accordingly according to the load capacity and performance indicators of the hardware resource, which is conducive to improving the efficiencies of the retrieval of identical images and the retrieval of similar images and subsequent image recommendation.

Figure 4:
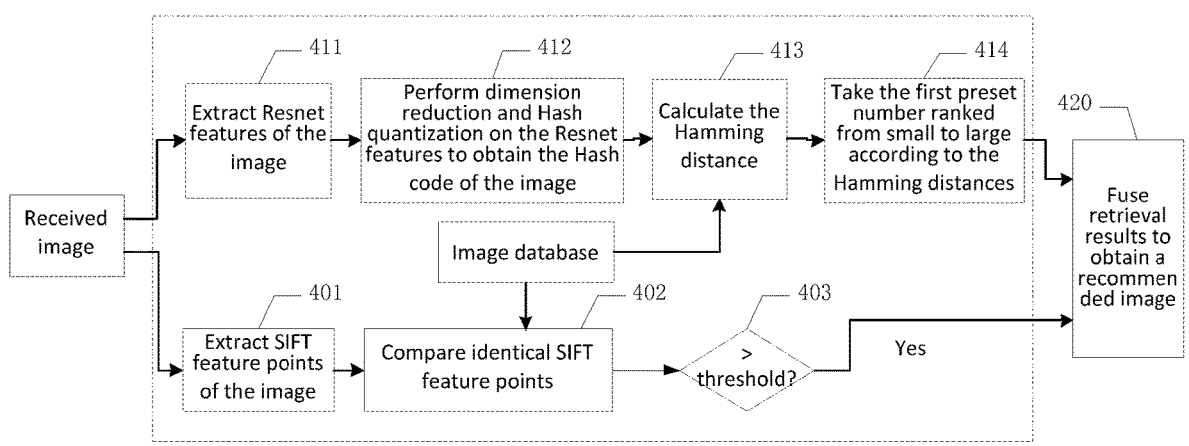
FIG. 4 shows a schematic diagram of an optional implementation according to an embodiment of this disclosure.

FIG. 4 shows a schematic diagram of an optional implementation according to an embodiment of this disclosure. Therein, boxes 401-403 show an implementation of an example of the step 304. In box 401, for an image received by the server, SIFT feature points of the received image are extracted. Then, in box 402, the SIFT feature points of the received image with SIFT feature points of individual standard images pre-stored in an image library and a standard image whose SIFT feature points are identical to those of the received image the most is determined. In box 403, it is judged whether the number of the identical SIFT feature points of the determined standard image and the received image is greater than a preset threshold, and if it is, result of the identical image retrieval is the determined standard image, and if it is not, result of the identical image retrieval is that no identical image exists.

Boxes 411-414 show an implementation of an example of the step 306. In box 411, for an image received by the server, Resnet features of the received image are extracted. In box 412, dimension reduction and Hash quantization is performed on the Resnet features of the received image to obtain the Hash code of the received image. Then, in box 413, the Hamming distances between the Hash code of the received image and the Hash codes of the individual standard images in the image library are calculated. In box 414, preset number of standard images ranked ahead from small to large according to the calculated Hamming distances are taken as result of the similar image retrieval.

Since the amount of calculation of directly employing the Resnet features for matching is large, the way in which this implementation employs Hash quantization and then utilizes Hash codes for matching may cause the efficiency of the retrieval of similar images to be greatly improved.

Finally, in box 420, the SIFT feature based identical image retrieval result and the Resnet feature based similar image retrieval result are fused to obtain the final recommended image. The order in which the step 304 and the step 306 are performed will not be limited in this disclosure. In an example, the step 304 and the step 306 may be performed synchronously, that is, the boxes 401-403 and the boxes 411-414 are performed in parallel. Adoption of such a way in which the retrieval of identical images and the retrieval of similar images are performed in parallel may increase the image retrieval speed.

Figure 5:
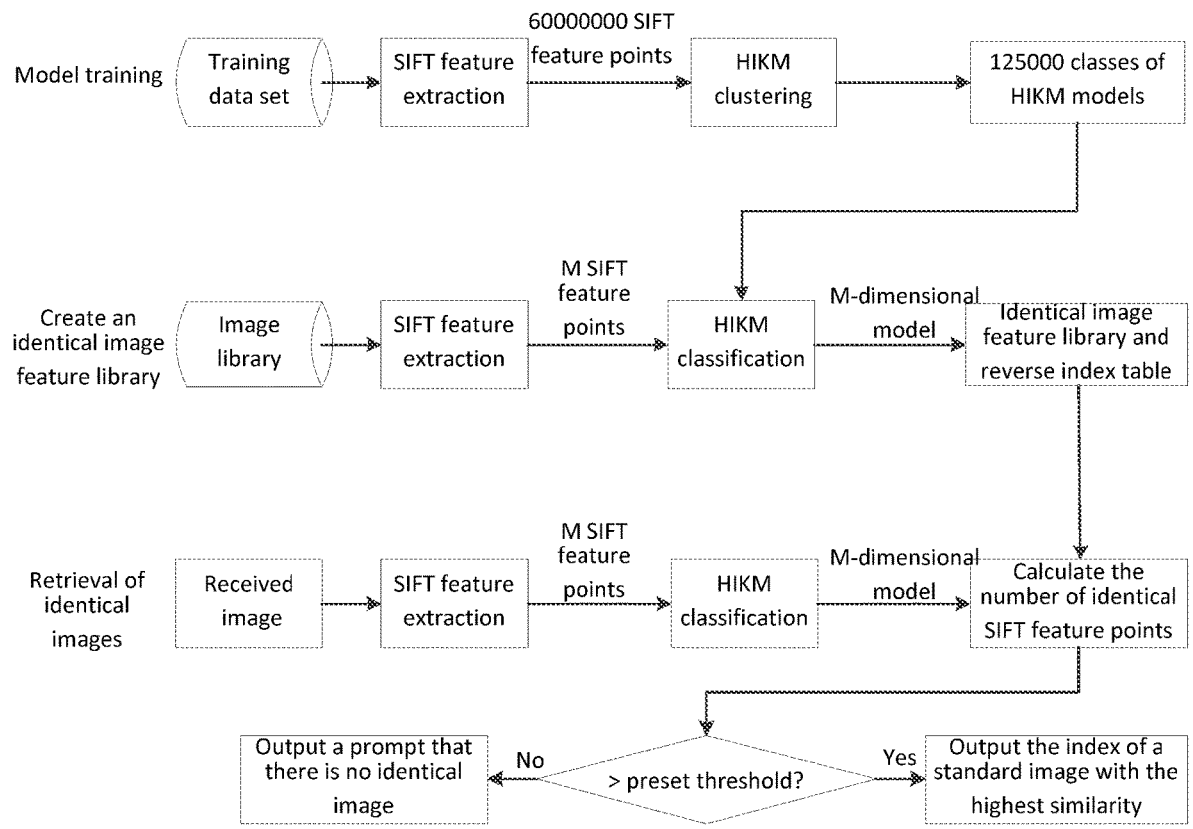
FIG. 5 shows a further schematic diagram of the implementation of FIG. 4.
Figure 6:
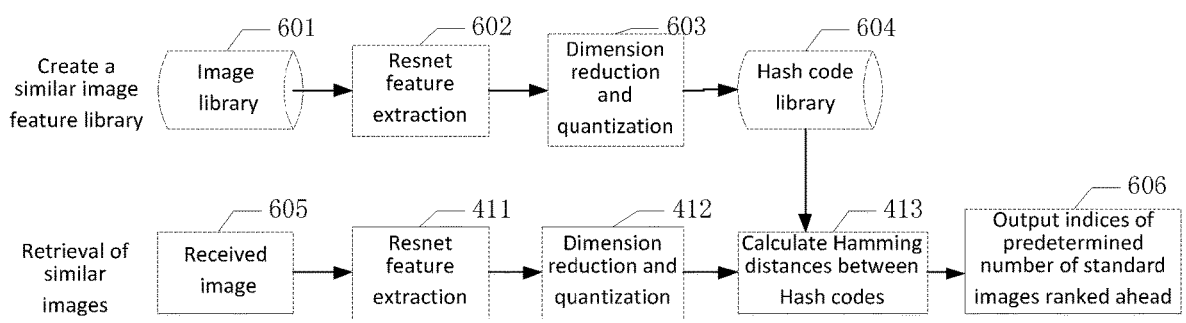
FIG. 6 shows a further schematic diagram of the implementation of FIG. 4.

FIG. 5 and FIG. 6 show further schematic diagrams of the implementation of FIG. 4, wherein further examples of the steps 304 and 306 are further described in detail, respectively. In the examples of FIG. 5 and FIG. 6, construction of a database is also depicted.

In FIG. 5, there are shown three stages: model training, creating an identical image feature library and retrieval of identical images. Therein, at the stage of model training, a training data set of standard images is created, SIFT feature point extraction is employed, HIKM (Hierarchical Version of Integer K-means) is employed to perform clustering on the obtained SIFT feature points (e.g., 60000000) of the individual standard images, a HIKM classification model (e.g., 125000 classes) is obtained by training and stored.

At the stage of creating an identical image feature library, first, for example M SIFT feature points of all the standard images in the image library are extracted, a word bag model is utilized to cluster the SIFT feature points into K classes, a word bag model feature vector of SIFT feature points of M dimensions is established for each standard image, the HIKM hierarchical clustering model is then used to build a dictionary, and the SIFT feature points are divided into for example 125000 classes. As such, all the standard images in the image library are allocated to for example 125000 barrels, thereby establishing the identical image feature library. Then, a reverse index table may be created and saved accordingly.

At the stage of retrieval of identical images, for an image received by the server, SIFT feature points corresponding to the image are obtained in a way similar to the operation of standard images as described above. Then, the number of identical SIFT feature points of the received image and each standard image in the identical image feature library index table is calculated as the similarity. It is judged whether there is a similarity greater than a preset threshold T, and if it is, it is indicated that there are identical images in the image library and then an index corresponding to the standard image with the largest similarity is outputted, and if it is not, it is indicated that there is no identical image in the image library and a prompt that there is no identical image may be outputted.

Figure 8:
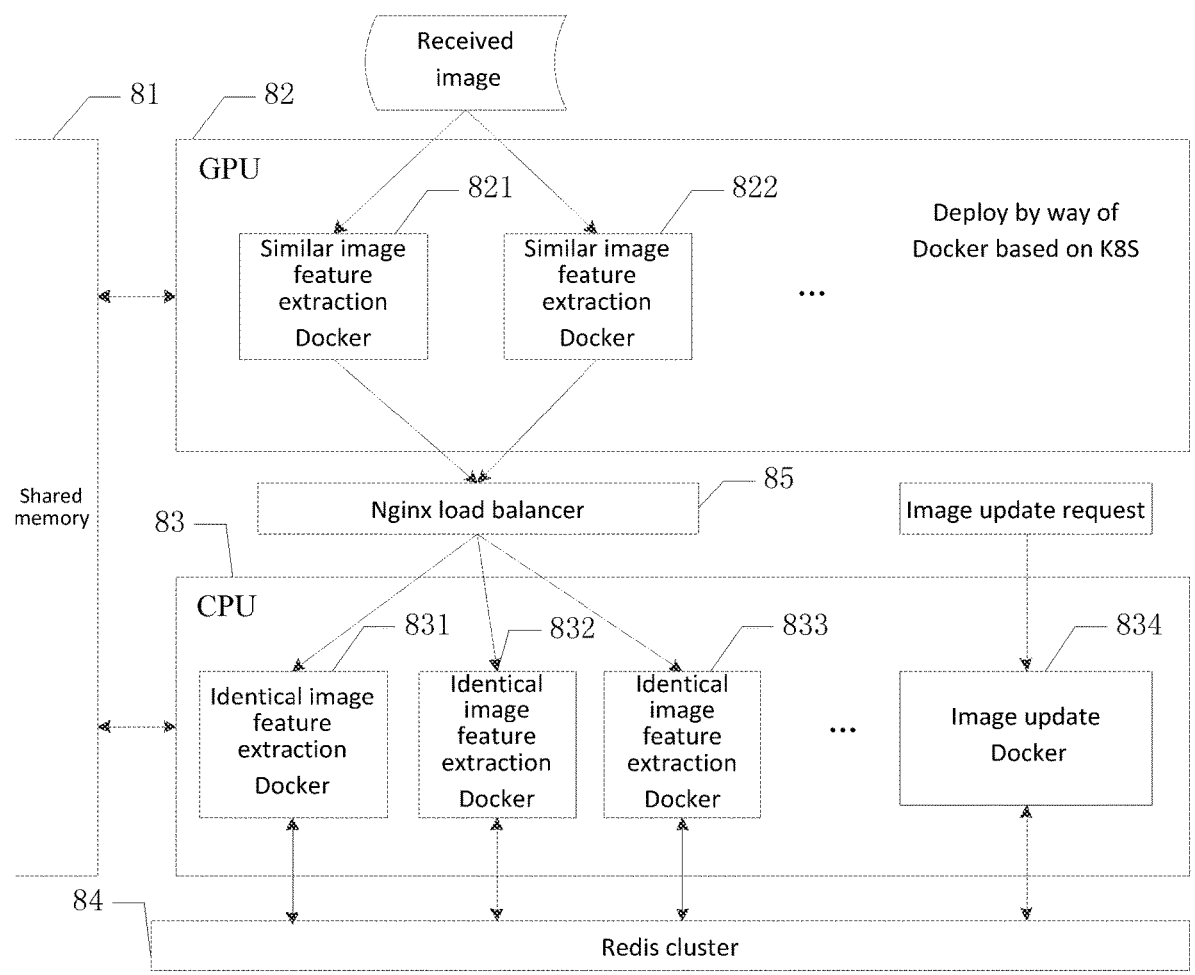
FIG. 8 shows a schematic diagram of a cloud server deployment scheme according to an embodiment of this disclosure.

In FIG. 6, the retrieval of similar images based on Resnet features includes two stages: creating a similar image feature library and retrieval of similar images. At the stage of creating a similar image feature library, first, in box 602, Resnet features of all the standard images in the image library 601 are extracted. Since the Resnet network is relatively complex, if done at the CPU Docker, Resnet feature extraction will be slow and therefore the part of Resnet feature extraction is performed at the GPU Docker, as shown in FIG. 8, and TensorRT is employed for calculation acceleration to increase the speed of Resnet feature extraction and shorten the response time of Resnet feature extraction. Resnet feature codes extracted at the GPU Docker are sent to the CPU Docker, the CPU Docker is utilized to perform dimension reduction and Hash quantization on the Resnet feature codes of the individual standard images at box 603, and a corresponding Hash code library 604 is obtained, that is, the similar image feature library is established.

At the stage of retrieval of similar images, an image 605 received by the server is for example transferred to the GPU Docker for Resnet feature extraction (box 411) employing for example TensorRT, the obtained Resnet feature codes of the image are sent to the CPU Docker, the CPU Docker is utilized to perform dimension reduction and Hash quantization (box 412) on the Resnet feature codes of the image to obtain the Hash code of the image, then the Hamming distance between the Hash code of the image and the Hash code of each standard image in the Hash code library is calculated (box 413), the Hamming distances are ranked from small to large, and indices of the first predetermined number (e.g., 20) of corresponding standard images are outputted (box 606). Therein, since the Resnet features are fractions of 2048 dimensions, if they are directly used for matching, it is necessary to perform distance calculation such as Euclidean distance for every digit. However, they are converted into 0s or 1s or 1024 or 512 dimensions by Hash quantization, and it is only necessary to perform XOR calculation, which may clearly increase the retrieval speed.

Figure 7:
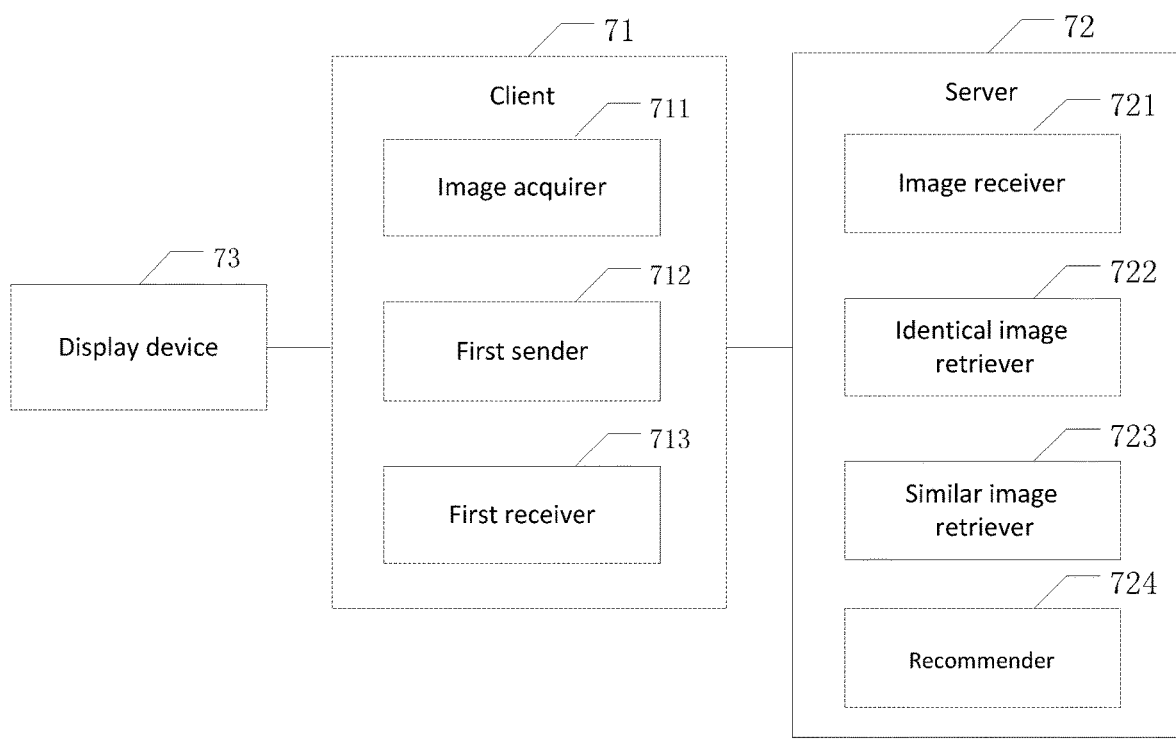
FIG. 7 shows an image recommendation system according to an embodiment of this disclosure.

FIG. 7 shows an image recommendation system according to an embodiment of this disclosure, which includes a client 71, a server 72 and a display device 73, wherein the client 71 includes a smart phone, a tablet computer, a personal digital assistant, a game console, a laptop notebook, a smart wearable device, etc., and interacts with the server through an APP installed thereon, and the display device is for example an electronic picture screen, a television, a projector, etc.

The client 71 includes an image acquirer 711, a first sender 712 and a first receiver 713. Therein, the image acquirer 711 is configured to acquire an image. The first sender 712 is configured to send the image to the server 72, such that the server 72 extracts a scale invariant feature of the image and performs retrieval of identical images according to the scale invariant feature of the image, and such that the server 72 extracts a multi-scale feature of the image and performs retrieval of similar images according to the multi-scale feature of the image. The first receiver 713 is configured to receive at least one recommended image from the server, wherein the at least one recommended image is based on result of the identical image retrieval and result of the similar image retrieval.

The server 72 includes a second receiver 721, an identical image retriever 722, a similar image retriever 723 and a recommender 724. Therein, the second receiver 721 is configured to receive an image sent by the client, the identical image retriever 722 is configured to extract a scale invariant feature of the image and perform retrieval of identical images according to the scale invariant feature of the image, the similar image retriever 723 is configured to extract a multi-scale feature of the image and perform retrieval of similar images according to the multi-scale feature of the image, and the recommender 724 is configured to send at least one recommended image to the client according to result of the identical image retrieval and result of the similar image retrieval.

Therein, communication is conducted via a network between the client and the server and between the client and the display device, respectively, and the network may include various connection types, for example, a wired connection such as Ethernet, twisted pair, fiber optic cable, or a wireless communication connection such as Wi-Fi, ZigBee, Bluetooth, or a combination thereof, or the like.

In some optional implementations of this embodiment, the server includes a cloud server, and the cloud server is built with a CPU Docker and a GPU Docker. By employing such an implementation, the CPU Docker and the GPU Docker may share the same hardware resource, and a hardware resource may be increased or decreased and shared or separately used accordingly according to the load capacity and performance indicators of the hardware resource, which is conducive to improving the efficiencies of the retrieval of identical images and the retrieval of similar images and subsequent image recommendation.

FIG. 8 shows a schematic diagram of a cloud server deployment scheme according to an embodiment of this disclosure. The cloud server deployment scheme is configured with a shared memory 81, a GPU 82, a CPU 83, a Redis cluster 84 and Nginx load balancer 85, etc. Therein, in a container cloud platform based on Kubernetes (K8S for short) are built with GPU Docker 821, GPU Docker 822, . . . , on the GPU Docker is deployed an algorithm which implements similar image feature extraction, for example, the algorithm of the part of Resnet feature extraction, the extracted Resnet feature codes for example of standard images and the Resnet feature code for example of the received image are sent to the CPU Docker, and in addition, the received image is also forwarded by the GPU Docker to the CPU Docker. In the CPU Docker are arranged an algorithm for identical image feature extraction (e.g., CPU Docker 831), an algorithm for retrieval of identical images (e.g., CPU Docker 832), an algorithm for retrieval of similar images (e.g., CPU Docker 833) and an algorithm for image update (e.g., CPU Docker 834), etc., and the used GPU Docker and CPU Docker may increase or decrease the number of hardware resources and share or separately use them according to the load capacities and performance indicators of the hardware resources. Adoption of a Docker deployment scheme in which the GPU Docker is combined with the CPU Docker can effectively assess the utilization of hardware resources and facilitate algorithm transplantation and resource expansion.

An Nginx load balancer 85 is arranged between the GPU Docker and the CPU Docker, whose function is as follows. The larger the number of visits to a server per unit time, the greater the stress on the server is, and when the stress is so large as to exceed its own affordability, the server will crash. To avoid the server crashes and let the user have a better experience, the server stress may be shared by way of Nginx load balance. A way of implementation is as follows: a server cluster is built by establishing many servers, and when a user visits a website, he first visits an intermediate server, the intermediate server is made to select a server with a less stress from the server cluster next, and then the visit request is introduced to the server. In such a way, for each visit of users, it will be guaranteed that the stress on each server in the server cluster tends to balance, the server stress is shared, and a situation in which a server crashes is avoided.

The shared memory 81 is configured to store the code data of the individual algorithms and the model files for being called by the individual algorithms.

In addition, the image update including update of the identical image library and the similar image library is implemented by interaction with the Redis cluster 84. An image library update scheme employing the Redis cluster 84 can timely and effectively update the identical image library and the similar image library without restarting a service.

It needs to be noted that, algorithms for similar image feature extraction and retrieval and identical image feature extraction and retrieval provided by the embodiment may refer to the above description with reference to FIGS. 1-6, which will not be repeated here any longer.

Figure 9:
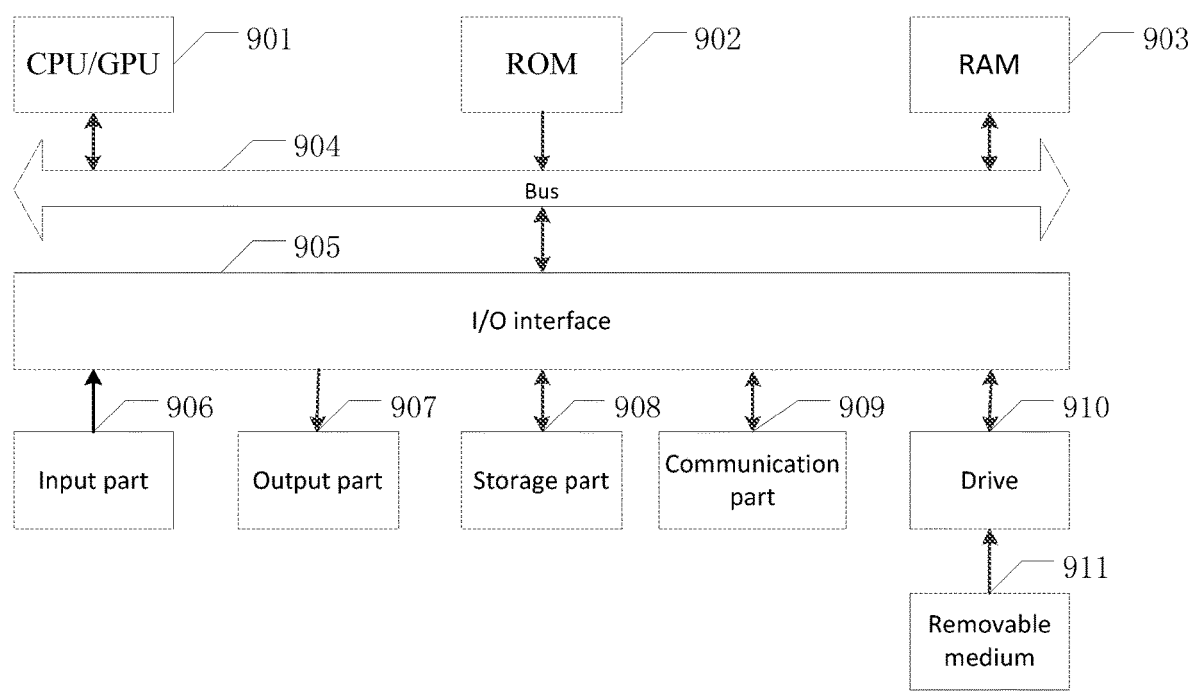
FIG. 9 shows a schematic diagram of a hardware architecture of a server according to an embodiment of this disclosure.

FIG. 9 shows a schematic diagram of a hardware architecture of a server according to an embodiment of this disclosure. Therein, there is included a central processing unit (CPU)/graphics processing unit (GPU) 901, which may perform various suitable actions and processing according to a program stored in a read-only memory (ROM) 902 or a program loaded from a storage to a random access memory (RAM) 903. In the RAM are further stored various programs and data required for operations of the computer system. The CPU/GPU 901, the ROM 902 and the RAM 903 are connected with each other via a bus 904. An input/output (I/O) interface 905 is also connected to the bus.

The following components are connected to the I/O interface: an input part 906 including a keyboard, a mouse, etc., an output part 907 including such as a liquid crystal display (LCD), etc. and a loudspeaker, etc., a storage part 908 including a hard disk, etc., and a communication part 909 including a network interface card such as a LAN card, a modem, etc. The communication part performs communication processing via a network such as the Internet. A drive 910 is also connected to the I/O interface as required. A removable medium 911, such as a magnetic disk, optical disk, magneto-optical disk, semiconductor memory, etc., is installed on the drive as required, in order that a computer program read out therefrom is loaded into the storage part as needed.

In particular, according to an embodiment of this disclosure, a process described in a flow chart above may be implemented as a computer software program. For example, an embodiment of this disclosure includes a computer program product including a computer program tangibly contained in a computer readable medium, which computer program contains program codes for implementing a method as shown in a flow chart. In such an embodiment, the computer program may be downloaded and installed from a network by the communication part, and/or installed from the removable medium.

The flow charts and schematic diagrams in the drawings illustrate system architectures, functions and operations that may be implemented by the system, method and computer program product of the embodiments of this disclosure. In this respect, each box in the flow charts or schematic diagrams may represent a portion of a code, a program segment, or a module, and the portion of the code, the program segment, or the module contains one or more executable instruction for implementing a specified logic function. It should also be noted that in some alternative implementations, functions marked in boxes may also take place in an order other than those marked in the drawings. For example, two successively marked boxes may in fact be implemented basically in parallel, and they sometimes may also be implemented in a reverse order, which depends on the involved function. It should also be noted that each box in the schematic diagrams and/or flow charts and a combination of boxes in the schematic diagrams and/or flow charts may be implemented by a dedicated hardware-based system for implementing a specified function or operation, or may be implemented by a combination of dedicated hardware and computer instructions.

An involved module described in an embodiment of this disclosure may be implemented by way of software, or also may be implemented by way of hardware. The described modules may also be arranged in a processor, which for example may be described as: a processor including an identical image retriever, a similar image retriever and a recommender. Therein, in some case, the names of these modules do not constitute a limitation to the modules themselves. For example, the identical image retriever may further be described as an "identical image matcher".

On the other hand, an embodiment of this disclosure further provides a non-volatile computer storage medium, which may be one contained in the above apparatuses in the above embodiments, or also may be one which is stand-alone and is not assembled into the client. The non-volatile computer storage medium stores one or more program, which when executed by a computing device, causes the computing device to: receive an image sent by a client; extract a scale invariant feature of the image and perform retrieval of identical images according to the scale invariant feature of the image, and extract a multi-scale feature of the image and perform retrieval of similar images according to the multi-scale feature of the image; and send at least one recommended image to the client according to result of the identical image retrieval and result of the similar image retrieval.

It needs to be noted that in the description of this disclosure, the term "include", "including" or any other conjugation thereof is intended to encompass a non-exclusive inclusion, such that a procedure, method, article, or device including a series of elements not only includes those elements, but also includes other elements not expressly listed, or further includes elements inherent to the procedure, method, article, or device. In the absence of more restrictions, an element defined by a phrase "includes . . . " does not exclude the presence of additional identical elements in a procedure, method, article, or device including the element.

Obviously, the above embodiments of this disclosure are just examples for clearly describing the invention, and not limitations on implementations of the invention. For the person having ordinary skills in the art, other changes or variations in different forms may further be made on the basis of the above description. Here, it is impossible to exhaustively numerate all the implementations, and obvious changes or variations derived from the technical solution of the invention are all still within the protection scope of the invention.

The invention claimed is:

1. An image recommendation method for a client, comprising:
  acquiring an image;
  sending the acquired image to a server, such that the server is configured to extract a scale invariant feature of the acquired image and is configured to perform retrieval of identical images according to the scale invariant feature of the acquired image, and such that the server is configured to extract a multi-scale feature of the acquired image and is configured to perform retrieval of similar images according to the multi-scale feature of the acquired image; and
  receiving at least one recommended image,
  wherein the at least one recommended image is based on a result of the identical image retrieval and a result of the similar image retrieval;
  wherein before the sending the acquired image to a server, the method further comprises: performing distortion correction algorithm based image processing on the acquired image by performing operations comprising:
  performing straight line detection using a Line Segment Detector straight line detection operator to obtain interfered straight lines;
  grouping the interfered straight lines obtained by the detection into a horizontal set and a vertical set;
  merging approximately parallel straight lines in the interfered straight lines;
  determining optimal boundary lines and vertices in the merged straight lines; and
  performing perspective transformation processing on the acquired image based on the optimal boundary lines and vertices.

2. The method as claimed in claim 1, wherein the method further comprises:
  presenting the at least one recommended image and/or sending the at least one recommended image to a display device such that the display device presents the at least one recommended image.

3. The method as claimed in claim 1, wherein the image processing further comprises:
  performing adjustment of optimal vertices in response to manual adjustment of vertices input by a user via a user interface.

4. A computer readable storage medium with a computer program stored thereon, wherein when executed by a processor, the program implements a method as claimed in claim 1.

5. An image recommendation method for a server, comprising:
  receiving an image sent by a client;
  extracting a scale invariant feature of the received image and performing retrieval of identical images according to the scale invariant feature of the received image, and extracting a multi-scale feature of the received image and performing retrieval of similar images according to the multi-scale feature of the received image, comprising:
  extracting a scale invariant feature transformation (SIFT) feature of the received image and performing retrieval of identical images according to the SIFT feature of the received image, and extracting a residual network (Resnet) feature of the received image and performing retrieval of similar images according to the Resnet feature of the received image; and sending at least one recommended image to the client according to a result of the identical image retrieval and a result of the similar image retrieval;

wherein the extracting a SIFT feature of the received image and performing retrieval of identical images according to the SIFT feature of the received image further comprises:

extracting SIFT feature points of the received image;

comparing the SIFT feature points of the received image with SIFT feature points of individual standard images in an image library;

determining a standard image whose SIFT feature points are most nearly identical to those of the received image;

judging whether a number of identical SIFT feature points of the determined standard image and the received image is greater than a preset threshold;

when the number is greater than the preset threshold, the result of the identical image retrieval is the determined to be the standard image; and when the number is less than the preset threshold, the result of the identical image retrieval is determined that no identical image exists.

6. The method as claimed in claim 5, wherein the extracting a SIFT feature of the received image and performing retrieval of identical images according to the SIFT feature of the received image, and extracting a Resnet feature of the received image and performing retrieval of similar images according to the Resnet feature of the received image, further comprises:

utilizing a central processing unit (CPU) to extract a SIFT feature of the received image and perform retrieval of identical images according to the SIFT feature of the received image, and utilizing a graphics processing unit (GPU) to extract the Resnet feature of the received image and utilizing the CPU to perform retrieval of similar images according to the Resnet feature of the received image.

7. The method as claimed in claim 5, wherein the extracting a Resnet feature of the received image and performing retrieval of similar images according to the Resnet feature of the received image further comprises:

extracting Resnet features of the received image;

performing dimension reduction and Hash quantization on the Resnet features of the received image to obtain the Hash code of the received image;

calculating a Hamming distances between the Hash code of the received image and the Hash codes of the individual standard images in an image library; and taking a preset number of standard images ranked ahead from small to large according to the Hamming distances as the result of the similar image retrieval.

8. A computer system comprising a memory, a processor and a computer program which is stored on the memory and is configured to run on the processor, wherein when executing the computer program, the processor performs operations comprising:

receiving an image sent by a client;

extracting a scale invariant feature of the received image and performing retrieval of identical images according to the scale invariant feature of the received image, and extracting a multi-scale feature of the received image and performing retrieval of similar images according to the multi-scale feature of the received image, comprising:

extracting a scale invariant feature transformation (SIFT) feature of the received image and performing retrieval of identical images according to the SIFT feature of the received image, and extracting a residual network (Resnet) feature of the received image and performing retrieval of similar images according to the Resnet feature of the received image; and sending at least one recommended image to the client according to a result of the identical image retrieval and a result of the similar image retrieval;

wherein the extracting a SIFT feature of the received image and performing retrieval of identical images according to the SIFT feature of the received image further comprises:

extracting SIFT feature points of the received image;

comparing the SIFT feature points of the received image with SIFT feature points of individual standard images in an image library and determining a standard image whose SIFT feature points are most nearly identical to those of the received image; and judging whether a number of identical SIFT feature points of the determined standard image and the received image is greater than a preset threshold, when the number is greater than the preset threshold, the result of the identical image retrieval is the determined standard image; and when the number is less than the preset threshold, the result of the identical image retrieval is that no identical image exists.

9. The computer system as claimed in claim 8, wherein the extracting a SIFT feature of the received image and performing retrieval of identical images according to the SIFT feature of the received image, and extracting a Resnet feature of the received image and performing retrieval of similar images according to the Resnet feature of the received image, further comprises:

utilizing a central processing unit (CPU) to extract a SIFT feature of the received image and perform retrieval of identical images according to the SIFT feature of the received image, and utilizing a graphics processing unit (GPU) to extract a Resnet feature of the received image and utilizing the CPU to perform retrieval of similar images according to the Resnet feature of the received image.

10. The computer system as claimed in claim 8, wherein the extracting a Resnet feature of the received image and performing retrieval of similar images according to the Resnet feature of the received image further comprises:

extracting Resnet features of the received image;

performing dimension reduction and Hash quantization on the Resnet features of the received image to obtain the Hash code of the received image;

calculating a Hamming distances between the Hash code of the received image and the Hash codes of the individual standard images in an image library; and taking a preset number of standard images ranked ahead from small to large according to the Hamming distances as the result of the similar image retrieval.

11. The computer system as claimed in claim 8, wherein the computer system comprises a cloud server, and the cloud server is built with a CPU Docker and a GPU Docker.

12. The computer system as claimed in claim 11, wherein the GPU Docker is configured to extract a multi-scale feature of an image, and the CPU Docker is configured to extract a scale invariant feature of the received image and perform retrieval of identical images according to the scale invariant feature of the received image and perform retrieval of similar images according to the multi-scale feature of the received image.

\* \* \* \* \*